US009777462B2

(12) United States Patent
Verstraelen et al.

(10) Patent No.: US 9,777,462 B2
(45) Date of Patent: Oct. 3, 2017

(54) METHOD FOR DREDGING AN UNDERWATER BOTTOM IN AN AREA USING A DREDGING DEVICE

(71) Applicant: Baggerwerken Decloedt en Zoon, Oostende (BE)

(72) Inventors: Luk Verstraelen, Vossem (BE); Arjan Cornelis Sybren Mol, Oudenbosch (NL)

(73) Assignee: Baggerwerken Decloedt en Zoon, Oostende (BE)

( * ) Notice: Subject to any disclaimer, the term of this patent is extended or adjusted under 35 U.S.C. 154(b) by 0 days.

(21) Appl. No.: 15/103,478

(22) PCT Filed: Dec. 15, 2014

(86) PCT No.: PCT/EP2014/077808
§ 371 (c)(1),
(2) Date: Jun. 10, 2016

(87) PCT Pub. No.: WO2015/086856
PCT Pub. Date: Jun. 18, 2015

(65) Prior Publication Data
US 2016/0312439 A1  Oct. 27, 2016

(30) Foreign Application Priority Data

Dec. 13, 2013 (BE) .................................. 2013/0840

(51) Int. Cl.
*E02F 3/90* (2006.01)
*E02F 9/20* (2006.01)
(Continued)

(52) U.S. Cl.
CPC .............. *E02F 9/2045* (2013.01); *B09C 1/00* (2013.01); *E02F 3/907* (2013.01); *E02F 5/006* (2013.01);
(Continued)

(58) Field of Classification Search
CPC .. A01H 4/001; B09C 1/00; B09C 1/02; B09C 1/06; B09C 1/08; B09C 1/10;
(Continued)

(56) References Cited

U.S. PATENT DOCUMENTS 4,839,061 A * 6/1989 Manchak, Jr. ........ E02B 15/106
210/170.01
5,065,019 A * 11/1991 Darilek .................. G01N 21/64
250/253
(Continued)

FOREIGN PATENT DOCUMENTS

EP      1811127 A1    7/2007
WO   2010079323 A1    7/2010

OTHER PUBLICATIONS

Australian Government et al., "The use of Hydrodynamic Numerical Modelling for Dredging Projects in the Great Barrier Reef Marine Park", Australian Government Great Barrier Reef Marine Park Authority Guidelines, Aug. 1, 2012, pp. 1-8.
(Continued)

*Primary Examiner* — Robert Pezzuto
(74) *Attorney, Agent, or Firm* — The Webb Law Firm

(57) ABSTRACT

The invention relates to a method for dredging an underwater bottom in an area using a dredging device. The method includes: determining the present positions of the dredging device and of a source of contamination in the area; entering input data relating to the area into a hydrodynamic model of the area; determining with the hydrodynamic model the degree of contamination at positions in the area resulting from spread of the contamination from the source; comparing the degree of contamination at positions in the area to a threshold value for these positions; and optionally adapting the dredging if the degree of contamination exceeds the threshold value. Underwater bottom can be dredged using the invented method, such that on the one hand the produc-
(Continued)

tion is maximized and on the other the consequences for the natural environment are minimized.

17 Claims, 4 Drawing Sheets

(51) Int. Cl.
  *B09C 1/00* (2006.01)
  *E02F 5/00* (2006.01)
  *E02F 9/26* (2006.01)
(52) U.S. Cl.
  CPC .............. *E02F 9/261* (2013.01); *E02F 9/262* (2013.01); *E02F 9/264* (2013.01)
(58) Field of Classification Search
  CPC ......... B63C 11/00; B63C 11/52; E02B 15/04; E02F 3/40; E02F 3/023; E02F 3/907; E02F 5/006; E02F 9/26; E02F 9/261; E02F 9/262; E02F 9/264; E02F 9/2045; G01N 21/64; G01N 27/414; G01N 33/24; G01N 2033/245
  USPC ..... 37/313, 322, 335, 333, 414; 210/167.01, 210/170.01, 170.4, 170.05, 747.4; 405/128.1, 128.25, 128.75, 264
  See application file for complete search history.

(56) References Cited

U.S. PATENT DOCUMENTS

| | | | |
|---|---|---|---|
| 5,542,781 A | 8/1996 | Yemington et al. | |
| 6,276,871 B1* | 8/2001 | Bruso ....................... | B09C 1/02 405/128.5 |
| 7,264,713 B2* | 9/2007 | Kryzak .................. | A01H 4/001 210/167.01 |
| 8,146,274 B2* | 4/2012 | Verstraelen ............. | E02F 3/907 37/317 |
| 9,389,214 B2* | 7/2016 | Adamchuk .......... | G01N 27/414 |
| 2005/0045556 A1 | 3/2005 | Kryzak | |
| 2012/0016557 A1 | 1/2012 | Verboomen | |

OTHER PUBLICATIONS

Malcolm Pimie et al., "Final Passaic River Environmental Dredging Pilot Study—Hydrodynamic Modeling", New Jersey, Oct. 1, 2005, pp. 1-107.

* cited by examiner

METHOD FOR DREDGING AN UNDERWATER BOTTOM IN AN AREA USING A DREDGING DEVICE

CROSS-REFERENCE TO RELATED APPLICATIONS

This application is the United States national phase of International Application No. PCT/EP2014/077808 filed Dec. 15, 2014, and claims priority to Belgian Patent Application No. 2013/0840 filed Dec. 13, 2013, the disclosures of which are hereby incorporated in their entirety by reference.

BACKGROUND OF THE INVENTION

Field of the invention

The present invention relates to a method for dredging an underwater bottom in an area using a dredging device. The invention likewise relates to a computer program comprising program instructions for performing of the method by a computer. The invention also relates to a computer configured to run such a computer program.

Description of Related Art

In the dredging of an underwater bottom a cutting member of a dredging device, such as for instance the suction head of a trailing suction hopper dredger or the cutter head of a cutter suction dredger in stationary position, is advanced over the underwater bottom. Dislodged soil particles are suctioned up here via a suction pipe connected to the dredging device.

In the dredging of an area it is of great importance to take into account unforeseen events which may cause damage to the area. It is thus possible for instance for the water temperature to rise too high, which results in death of flora and fauna. The water temperature could for instance rise when a power plant discharges its water in or close to the area for dredging or raising, whereby the local hydrodynamics are disrupted or break down. Another example relates to the dredging of a freshwater area adjoining a saltwater area, wherein the salt content (or salinity) could suddenly increase.

A particularly important example concerns an increased turbidity of the water as a result of entry into the water of fine sediment particles which are not suctioned away by the suction pipe, or insufficiently so. This source of contamination, generated by the dredging itself, can cause damage to for instance coral reefs. In the case of a trailing suction hopper dredger the fine particles can for instance enter the water via the overflow of the bin of the trailing suction hopper dredger and form a plume which spreads over the area for dredging behind the trailing suction hopper dredger.

The present invention has for an object to provide a method for dredging an underwater bottom, wherein on the one hand the production is maximized and on the other the consequences for the natural environment are minimized in accordance with requirements laid down therefor.

SUMMARY OF THE INVENTION

Particularly provided is a method for dredging an underwater bottom in an area using a dredging device, wherein the method comprises at least the following steps, taking place via a digital network under the control of a computer, of:
a) determining the present positions of the dredging device and of a source of contamination in the area;
b) entering input data relating to the area into a hydrodynamic model of the area;
c) determining with the hydrodynamic model the degree of contamination at positions in the area resulting from spread of the contamination from the source;
d) comparing the degree of contamination at positions in the area to a threshold value for these positions; and
e) optionally adapting the dredging if the degree of contamination exceeds the threshold value.

The method according to the invention makes it possible to predict at regular times, for instance daily, the spread of a contaminant over the area resulting from dredging with the dredging device. The dredging can then be adapted if desired on the basis of these predictions. It is thus possible for instance to temporarily interrupt dredging, to reduce the production of the source of contamination and/or change dredging parameters and/or to determine in an embodiment a future position of the dredging device.

Provided in an embodiment of the invention is a method wherein the present or a foreseen future position of the dredging device is adapted. During dredging with for instance a trailing suction hopper dredger a route is generally predicted for the dredging device. If the degree of contamination exceeds or is in danger of exceeding the threshold value at one or more positions in the area, in the present embodiment the predicted route can be adapted. The spread of the contamination over the area as a result of the adapted route can then be predicted with the method according to the invention. The desired route avoids vulnerable positions in the area, such as formed for instance by coral reefs. In the method according to the invention the threshold value can have the same value for all positions. Preferably however, the threshold value for positions will vary, wherein the threshold value for vulnerable positions will generally be lower than that for less vulnerable positions.

The method according to the invention makes use of a hydrodynamic model. Such a model preferably comprises a calculation grid of the area, wherein each intersection of the calculation grid defines a position in the area by means of a set of unique (x,y) coordinates. A bathymetry of the area produces a depth coordinate z for each position. It will be apparent that the density of the calculation grid (the number of positions per unit length) can be chosen freely depending on the desired accuracy. A suitable hydrodynamic model calculates at least the water level (water depth), the flow speed and the degree of contamination at a number of positions in the area, and preferably at all positions.

It is noted that the initial profile of the bottom depth is adjusted in a preferred embodiment of the invention by taking into account the changes possibly made in the depth profile of the bottom by the dredging device. These changes can be determined for instance for a trailing suction hopper dredger by measuring the quantity of excavated underwater bottom at a determined position of the trailing suction hopper dredger. This can be done by measuring the draught, a measurement of flow rate and concentration in the suction conduit or by collecting information relating to the position of the drag head, particularly the width thereof and the depth of penetration into the bottom. The depth profile resulting from the dredging can in this way be continuously adjusted.

In order to be able to adequately determine the degree of contamination in the area resulting from spread of contamination from one or more sources of contamination, in an embodiment of the invention a method is provided in which the input data comprise static input data which do not change appreciably during dredging and which at least relate to a geological model of the bottom for dredging. Such a geological model of the bottom of (parts of) the area can be obtained in known manner, for instance by performing drillings. An analysis of the thus obtained soil samples preferably comprises at least a granulometry of the bottom material.

Provided in another embodiment of the invention is a method in which the static input data comprise a bathymetry of the bottom, bottom properties and/or the calibration constants applied in the hydrodynamic model. Applying calibration constants in the hydrodynamic model makes it possible to increase the accuracy of the predictions. The calibration constants can be modified by comparing the degree of contamination predicted at positions with the model to the degree of contamination measured at the positions.

In addition to applying static input data, an embodiment of the method is characterized in that the input data comprise dynamic input data which change during the dredging and which comprise data relating to tidal currents, wind and wave fields and/or the production of the source of contamination.

In a preferred embodiment of the method the area is delimited by boundaries and the data relating to tidal currents comprise time series of water levels at the boundaries. Such time series can for instance be requested from local meteorological institutes and function as time-dependent boundary conditions for the hydrodynamic model. Water level differences defined at boundary parts of the area will for instance bring about a current from the one boundary part to the other boundary part.

Another embodiment of the method according to the invention has the feature that the data relating to the wind and wave fields comprise time series of respectively wind speed vectors and wave heights, periods and directions for positions in the area. This information can for instance be obtained from consultants engaged in weather forecasting.

In yet another embodiment of the method according to the invention the data relating to the production of the source of contamination comprise the amount of contamination from the source or sources of contamination produced per unit time. In the case of for instance a heat source the production can be the amount of heat produced per unit time. In another example, in which a salt source causes contamination, the production can be the quantity of salt introduced into the water per unit time.

The invented method is particularly suitable for minimizing the consequences for the natural environment during dredging, wherein the source of contamination is the dredging device itself. In the case of a trailing suction hopper dredger, during dredging of an area fine particles can for instance enter the water via the overflow of the bin of the trailing suction hopper dredger and form a plume which spreads over the area for dredging behind the trailing suction hopper dredger. This causes an increased turbidity of the water, which can for instance cause damage to coral reefs.

In a corresponding embodiment of the method according to the invention the production of the source of contamination comprises the quantity of bottom material introduced per unit time into the area by the dredging device. This quantity is generally expressed as a number of kg of bottom material per second, and is also referred to with the term spill. According to an embodiment of the invention, a method is provided in which the spill is calculated on the basis of a geological model of the bottom, the type of dredging device and the expected production of the dredging device at the position where it is presently located. It is also possible to measure the spill during dredging and enter this as input data into the hydrodynamic model.

According to an embodiment of the invented method, the degree of contamination at positions in the area is determined by a sediment transport model. Such a model can for instance use as input data flow speeds at positions in the area as well as fall velocities of bottom particles which enter the water. These fall velocities can for instance be obtained from the measured granulometry of the bottom material. On the basis hereof it is possible to calculate at a number of positions in the area, and preferably at all positions, how far away from the source of contamination a bottom particle is entrained by the current, and where this particle may eventually descend to the bottom. Turbulence occurring in the current can if desired also be taken into account in such a sediment transport model. It will be apparent that particularly fine particles of bottom material will remain suspended in the water for a long time.

The output of the sediment transport model relates to the content of fine soil particles in the water for positions in the area. In an embodiment of the method according to the invention it is possible to measure the degree of contamination, and more particularly the content of fine particles in the water. The content of fine particles is preferably measured by means of the turbidity (in NTU) or the sediment concentration (in mg/l). The measurements are preferably used to check the output of the model, wherein calibration constants of the model can if desired be modified so as to bring the output and the measurements closer together.

According to the invention the calculated degree of contamination at positions in the area is compared (preferably in continuous manner) during dredging to a threshold value for these positions. The dredging process is optionally adapted on the basis of the comparison if the degree of contamination exceeds the threshold value. Different criteria can be applied here. It is thus possible in an embodiment of the invention to adapt the dredging process only if the degree of contamination exceeds a threshold value for a determined period of time, preferably a number of days. It is also possible to use an average measure for the calculated values of the degree of contamination and to compare these to the threshold value. A suitable average measure is for instance the median.

If underwater bottom is for instance excavated using a trailing suction hopper dredger, the trailing suction hopper dredger according to the present invention will follow a route which satisfies a minimum value of an optimum criterium wherein on the one hand the production is maximized and on the other the consequences for the natural environment are minimized in accordance with requirements laid down herefor.

Because the underwater bottom for dredging and possible vulnerable parts of the area are located under water, it is not easy for the operator of a dredging device to dredge with a high efficiency and at the same time spare the vulnerable parts. It is advantageous to characterize the method according to the invention in that the degree of contamination is digitally visualized for the operator of the dredging device. Other quantities, such as the present position of the dredging device and/or of the sources of contamination and/or the depth profile of the underwater bottom, can for instance be digitally visualized if desired. The present position of the dredging device and/or of the sources of contamination can for instance be determined by a GPS system.

The invention likewise relates to a device for dredging an underwater bottom in an area using a dredging device. The device according to the invention comprises a central computer which is connected via a digital network to the dredging device and which is configured to perform a method comprising at least the steps of:

a) determining the present positions of the dredging device and of a source of contamination in the area;
b) entering input data relating to the area into a hydrodynamic model of the area;
c) determining with the hydrodynamic model the degree of contamination at positions in the area resulting from spread of the contamination from the source;
d) comparing the degree of contamination at positions in the area to a threshold value for these positions; and
e) optionally adapting the dredging process if the degree of contamination exceeds the threshold value.

Adapting of the dredging process can for instance comprise of temporarily interrupting the dredging, reducing the production of the source of contamination and/or changing dredging parameters and/or determining in an embodiment a future position of the dredging device. The computer is configured according to the invention to perform the method and is loaded for this purpose with a computer program comprising program instructions for performing the method. The advantages of such a device have already been elucidated with reference to the above discussed method and will not be repeated here. The device according to the invention collects the required input data and calculates the degree of contamination at positions in the area as a result of the spread thereof from one or more sources of contamination, which are preferably present in the area. In an embodiment of the device, the device compares the model output to threshold values for positions in the area and, on the basis of this comparison, transmits control signals via the digital network to the dredging device which optionally adjust the route thereof. In another embodiment the model output is made visible on a digital screen, on the basis of which an operator of the dredging device optionally adjusts the route. The model output can if desired be continuously recalculated by the computer in accordance with changes occurring in the input data, particularly the dynamic input data.

BRIEF DESCRIPTION OF THE DRAWINGS

The invention will now be further elucidated on the basis of the exemplary embodiments shown in the following figures, without otherwise being limited thereto.
Herein.

DETAILED DESCRIPTION OF THE INVENTION

Figure 1:
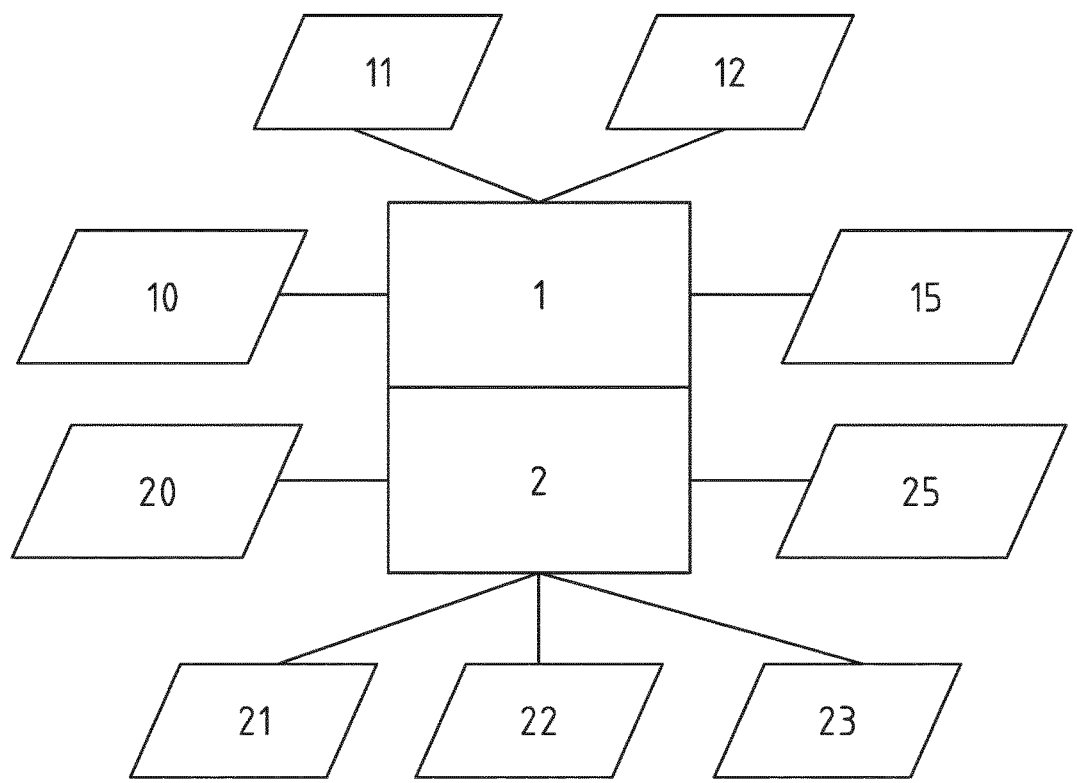
FIG. 1 shows schematically an embodiment of a model toolbox which is applied in the context of the method according to the invention.

Shown schematically with reference to FIG. 1 is an embodiment of a model toolbox which is applied in the context of the method according to the invention. The core of the toolbox is formed by a hydrodynamic model 1 of the area for dredging and a sediment transport model 2 coupled thereto. For the purpose of performing the calculations the area 5 for dredging is defined (see for instance FIG. 3) by designating the boundaries 50, and a calculation grid (not shown) is made which covers the area. The cells of the calculation grid define the positions at which the output of the models is determined.

The sediment transport model 2 uses flow speeds and underwater bottom shear stresses which are calculated by hydrodynamic model 1. The two models (1, 2) use input data, some of which comprise static input data (10, 20) which can optionally be changed by the operator of a system on the basis of measurements, but which hardly change at all during dredging. The static input data 10 for hydrodynamic model 1 comprise at least a bathymetry (depth profile) of the bottom and/or the calibration constants applied in hydrodynamic model 1. In addition, the viscosity and in some cases the salt content of the water can likewise form part of the static input data 10.

The static input data 20 for the sediment transport model 2 comprise at least the bottom properties and/or the sediment properties.

The input data (10, 20) can be defined as fields (for instance for the bathymetry), as time series and/or as scalar quantities. It will be self-evident that initial values have to be provided for all input data. Constant values can be assumed as static input data in the models, after which the models are calculated a number of times (a warm-up period is taken into account) in order to obtain the initial values. The results generated by the models in the warm-up period are generally not used. Another option consists of using the results of a previous calculation as input values in a subsequent calculation. The use of thus obtained dynamic initial values makes it possible to obtain good results as of the first calculations. The overall simulation time is therefore shorter, and prediction results are generated more quickly.

The input data further comprise dynamic input data (11, 12, 21, 22, 23) which change during dredging and which comprise data relating to tidal currents, wind and wave fields and/or the production of the source or sources of contamination.

Dynamic input data (11, 12) for the hydrodynamic model more particularly comprise boundary conditions 11 in the form of time series of water levels at the boundaries of the area. These boundary conditions 11 comprise calculated astronomical tides along the boundaries of the model area and can for instance be obtained from available tide models.

The dynamic data (11, 12) further comprise time series of wind speed vectors 12 at positions in the area, and optionally of wave data (such as wave height, direction and period). It is possible to obtain these data by point measurements of wind speed and wind direction. It may be appropriate particularly in wintery and transitional conditions to use 2-D wind and air pressure fields as input data 12.

The dynamic input data (21, 22, 23) for the sediment transport model comprise the quantity of contamination produced per unit time and, in an embodiment in which the source of contamination is the dredging device, the quantity of bottom material introduced per unit time into the area by the dredging device. In order to quantify this production a number of dredging vessels can be specified. The dynamic input data 23 then for instance comprise a time series which represents the route of the dredging vessel and the quantity of bottom material spilled by the dredging vessel.

The boundary conditions 21 for the sediment transport model 2 are generally set to zero (no sediment in the water along the boundaries of the area) since the models predict only excess sediment contents resulting from the dredging operations. It is however possible to define sediment contents differing from zero at the boundaries if this is desired.

The dynamic input data 22 comprise time series of wave fields as are predicted by the hydrodynamic model (as component of output 15, see below). The dynamic input data 22 particularly comprise time series of wave height, wave period and average wave direction for positions in the area. It is also possible to use a different source for the wave field information.

The output 15 of the hydrodynamic model relates to water levels, flow speeds and directions and bottom shear stresses at positions in the area.

The output 25 of the sediment transport model relates to the content of fine bottom particles in the water for positions in the area. In order to check the model output, in an embodiment of the method according to the invention the degree of contamination, and more particularly the content of fine particles in the water, is measured, preferably by means of turbidity measurements performed at positions.

Figure 2:
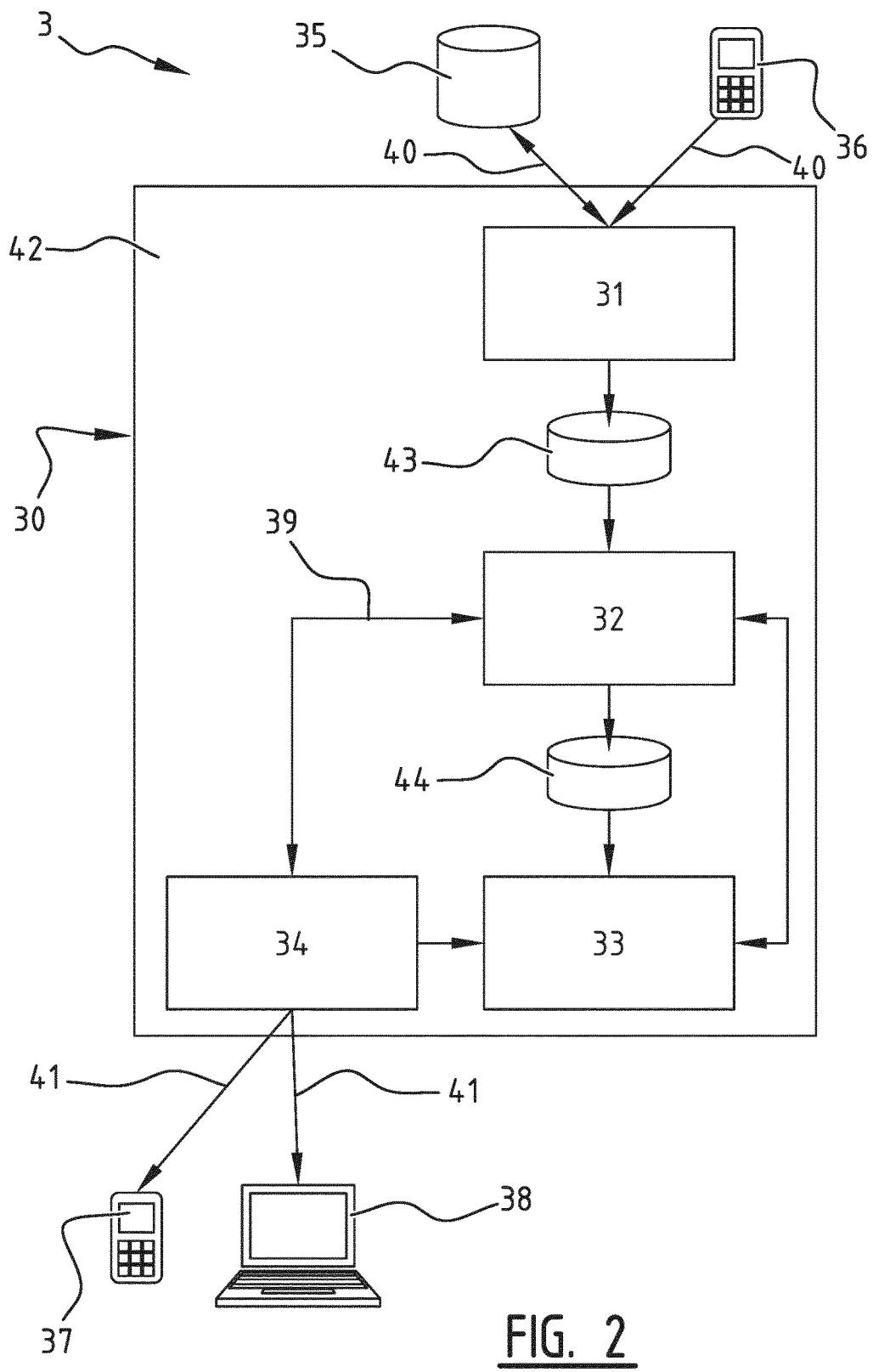
FIG. 2 shows schematically an embodiment of a device with which the method according to the invention can be performed.

Referring to FIG. 2, an embodiment is shown of a device 3 with which the method according to the invention can be performed. Device 3 comprises a central computer 30 which is connected via a digital network (40, 41) to one or more dredging devices (not shown) and which is configured to perform the method. The program instructions for having computer 30 perform the method are stored in an observation module 31, a prediction module 32, a decision module 33 and a warning module 34.

Observation module 31 collects substantially all historical, present and predicted data (input and output data 10, 11, 12, 20, 21, 22, 23, 15, 25) necessary for making the predictions. Observation module 31 can be connected via a part 40 of the digital network to external data sources 35, which for instance comprise databases, websites, FTP servers and the like, and/or to mobile connections 36. Observation module 31 retrieves the desired input and output data, preferably performs a quality check on the retrieved data and optionally converts the data into a usable format. A quality control of data can for instance relate to extreme values, missing data and/or to the reliability of data.

Prediction module 32 retrieves the input data (10, 11, 12, 20, 21, 22, 23) as well as data relating to the present positions of the dredging device(s) and of one or more sources of contamination in the area, and using a hydrodynamic model 1 of the area determines the degree of contamination at positions in the area resulting from spread of contamination from the source. Prediction module 32 likewise performs post-processing of the output data (15, 25) and preferably also comprises failover mechanisms in the case a model calculation crashes and/or essential input data are missing. In an embodiment in which a source of contamination is formed by a dredging device, the degree of contamination relates to the content of fine particles in the water as measured by means of the turbidity (in NTU), and the degree of contamination at positions in the area is determined by a sediment transport model 2, as described above. The models forming part of prediction module 32, particularly hydrodynamic model 1 and sediment transport model 2, can be run on a regular basis. It is thus possible for instance to run the models daily, wherein the output of the models for instance forms the initial conditions for the following day. Short-term predictions (3 to 7 days) increase the accuracy of the prediction, while long-term predictions (more than 7 days) can assist in discerning trends.

Decision module 33 supports the operator of a dredging device in interpreting the result of the prediction calculations (including the output data (15, 25)). Decision module 33 also provides information relating to the reliability of the model predictions. This can for instance take place by running the models (1 and/or 2) multiple times with changed input data (10, 11, 12, 20, 21, 22, 23). These calculations can be carried out automatically and/or be initiated by the operator.

The input data and the results generated by the models are stored in databases (35, 43, 44). In their simplest form the databases comprise a file-oriented directory structure comprising the data, external predictions and model results in a standardized format. More complex applications such as SQL and/or Oracle are also possible. The Open Earth-oriented system known to the skilled person for data storage, post-processing and reporting is particularly useful.

Finally, warning module 34 brings together the information relating to the prediction as simple, specific results and compares the degree of contamination at positions in the area to a threshold value for these positions. Warning module 34 also comprises instructions for automatic transmission of prediction results, such as for instance sending SMS messages to a mobile telephone 37 via a part 41 of the digital network in the case of an alarm, or sending concise reports via email to a workstation 38. If it is determined that threshold values have been exceeded, in a preferred embodiment warning module 34 initiates a feedback loop 39, wherein the model calculations are repeated by prediction module 32 a number of times with changed dredging scenarios (such as a different route, different dredging settings and so on) until preset threshold values for the degree of contamination are reached.

In this embodiment the entered dredging process is automatically adjusted when threshold values for the degree of contamination are exceeded until the threshold values are no longer being exceeded. The present or a foreseen future position of the dredging device is for instance adapted here.

In another embodiment it is likewise possible to allow partial intervention in the dredging process by an operator. Device 3 comprises for this purpose a graphic user interface 42 which digitally visualizes data and predictions, for instance for the operator of the dredging device. This makes interaction with the system possible. The graphic user interface 42 for instance makes it possible to digitally visualize the degree of contamination for the operator of the dredging device, on the basis of which he/she can adapt the dredging process when one or more threshold values are (in danger of being) exceeded.

The graphic user interface 42 more particularly comprises a configuration in which the operator can enter a choice relating to the type of dredging method to be applied, cycle times, net production times, overflow times of fine particles into the water, periods of standstill, dumping times, navigating speeds, starting and end positions of a dredging route, the position of dumping locations and estimated sediment spills. This list is not limitative and can be supplemented with other relevant input quantities.

The graphic user interface 42 further comprises a visualization interface in which the most recent prediction results, particularly flow speeds and sediment contents, are visualized, as well as the results of the comparison to threshold values. A suitable graphic user interface 42 has a section for each module (31, 32, 33, 34) and is web-based so that the results can be viewed remotely, if desired in a sheltered area.

Figure 3:
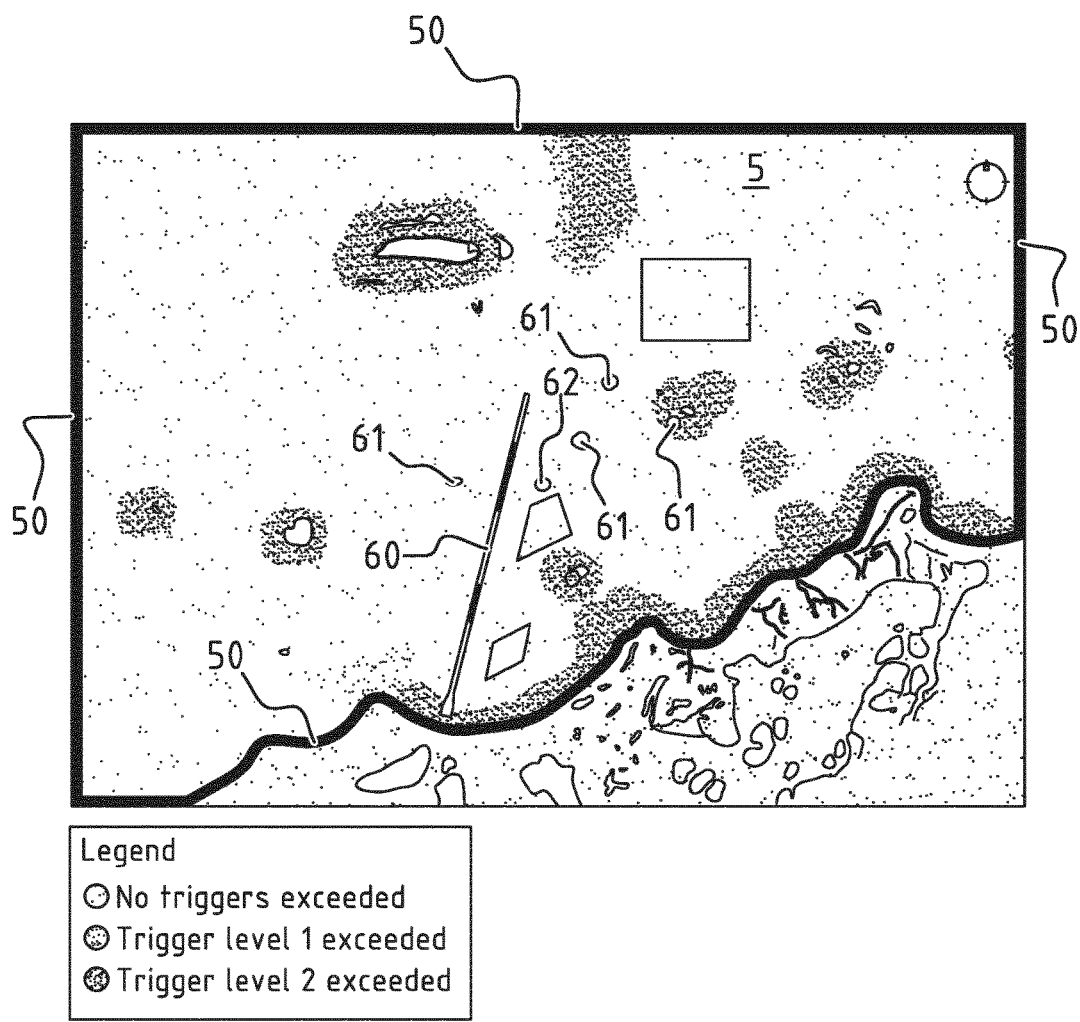
FIG. 3 shows schematically an embodiment of a visualization interface according to the invention which represents a map of the area for dredging.

An example of a visualization interface is proposed in FIG. 3. The interface comprises a map of the area for dredging, which is delimited by boundaries 50. The map can for instance comprise a Google Earth image. The dredging route 60 is shown on the map. Also shown are positions (61, 62) in the calculation grid where the predicted sediment contents in the water exceed preset threshold values, wherein the colour of the positions varies with the extent to which the values are exceeded. A first threshold value is thus exceeded at positions 61, while a second threshold value, which is higher than the first threshold value, is exceeded at positions 62. In the given example the first threshold value is not exceeded in the rest of the area, and so the second threshold value is certainly not exceeded. The threshold values are for instance chosen depending on the vulnerability of positions in the area.

Figure 4:
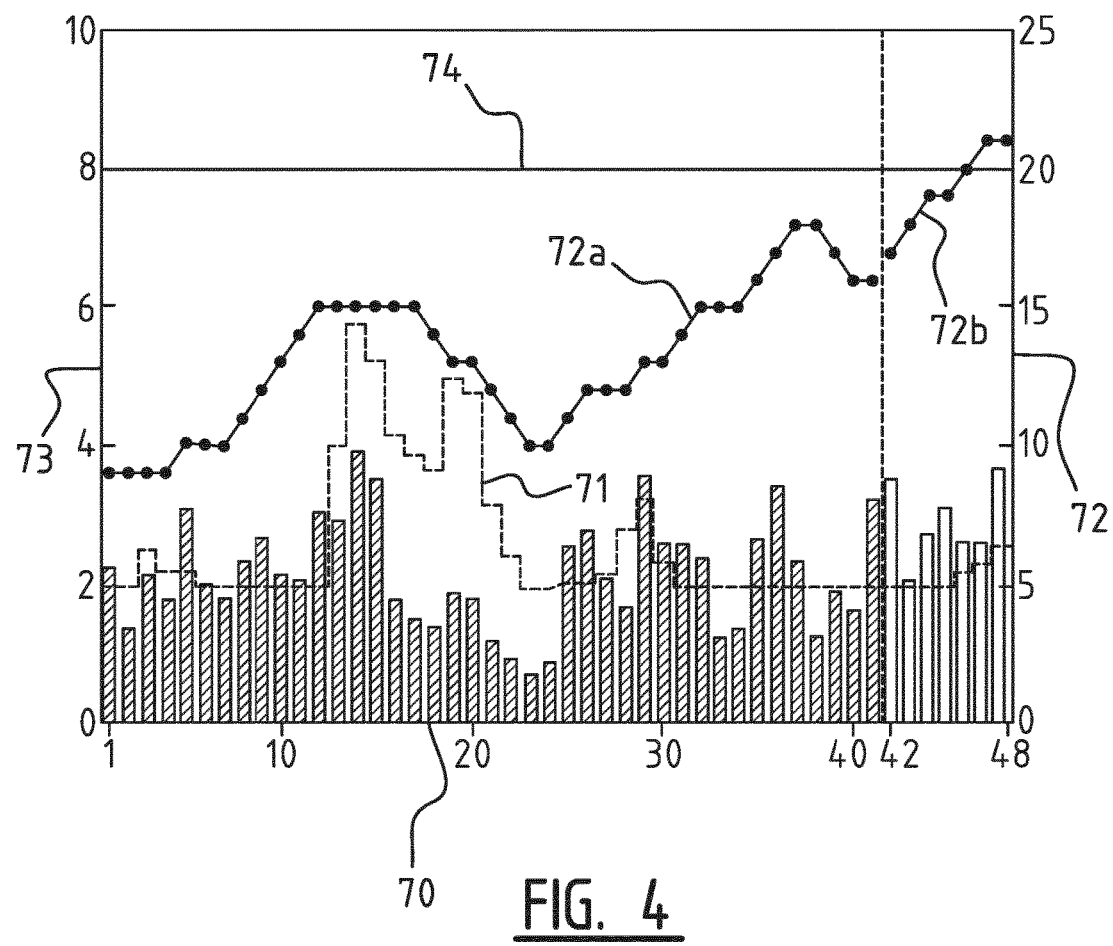
FIG. 4 shows a schematic representation of a possible output of a calculation performed by an embodiment of the device according to the invention.

Specifying a position (61, 62) opens a new screen of the graphic interface which shows detail information relating to the results obtained at the specified position. An embodiment of such detail information is shown in FIG. 4.

The manner in which warning module 34 brings together the information relating to the prediction in simple, specific results and compares the degree of contamination at positions in the area to a threshold value for these positions can take place in any way. The output data can thus for instance be shown as average values, as the median or an occurring maximum value. In the example shown in FIG. 4 a number of daily measurements (from day 1 to 41) of (median 73 of) the sediment content (in mg/l) at the specified position is supplemented with predicted values for the days 42 to 48 generated by prediction module 32. The broken line 71 represents the predetermined threshold values for the specified position. The lines (72a, 72b) further represent the progressive number of days on which the threshold value has been exceeded by the measured sediment content (line 72a) or the predicted sediment content (line 72b). The exceeding of a threshold value necessitating action being taken can for instance be defined by setting the threshold level at a median sediment content of 8 mg/l or by the daily threshold value being exceeded for 20 days (line 74). It will be apparent that other criteria can likewise be applied, depending on the specific conditions and set requirements on site.

The invention claimed is:

1. A method for dredging an underwater bottom in an area using a dredging device, comprising the following steps, taking place via a digital network under the control of a computer, of:
 a) determining the present positions of the dredging device and of a source of contamination in the area;
 b) entering input data relating to the area into a hydrodynamic model of the area;
 c) determining with the hydrodynamic model the degree of contamination at positions in the area resulting from spread of the contamination from the source;
 d) comparing the degree of contamination at positions in the area to a threshold value for these positions; and
 e) adapting the dredging if the degree of contamination exceeds the threshold value,
 wherein the present or a foreseen future position of the dredging device is adapted.

2. The method as claimed in claim 1, wherein the input data comprise static input data which do not change appreciably during dredging and which at least relate to a geological model of the bottom for dredging.

3. The method as claimed in claim 2, wherein the static input data comprise a bathymetry of the bottom, bottom properties and/or the calibration constants applied in the hydrodynamic model.

4. The method as claimed in claim 1, wherein the input data comprise dynamic input data which change during the dredging and which comprise data relating to tidal currents, wind and wave fields and/or the production of the source of contamination.

5. The method as claimed in claim 4, wherein the area is delimited by boundaries and the data relating to tidal currents comprise time series of water levels at the boundaries.

6. The method as claimed in claim 4, wherein the data relating to wind and wave fields comprise time series of respectively wind speed vectors and wave heights, periods and directions for positions in the area.

7. The method as claimed in claim 4, wherein the data relating to the production of the source of contamination comprise the amount of contamination produced per unit time.

8. The method as claimed in claim 1, wherein the source of contamination is the dredging device.

9. The method as claimed in claim 8, wherein the production of the source of contamination comprises the quantity of bottom material introduced per unit time into the area by the dredging device.

10. The method as claimed in claim 1, wherein the degree of contamination at positions in the area is determined by a sediment transport model.

11. The method as claimed in claim 1, wherein the degree of contamination relates to the content of fine particles in the water as measured by means of the turbidity (in NTU).

12. The method as claimed in claim 1, wherein the dredging process is adapted if the degree of contamination exceeds a threshold value for a number of days.

13. The method as claimed in claim 1, wherein the degree of contamination is digitally visualized for the operator of the dredging device.

14. A computer program comprising program instructions for performing of a method as claimed in claim 1 by a computer.

15. The computer program as claimed in claim 14, wherein the computer program is arranged on a physical carrier.

16. The computer program as claimed in claim 14, wherein the computer program is at least partially stored in a computer memory.

17. A computer configured to execute a computer program as claimed in claim 14.

* * * * *